US005615463A

United States Patent [19]

Wu

[11] Patent Number: 5,615,463

[45] Date of Patent: Apr. 1, 1997

[54] SEALED BUTTON

[76] Inventor: Ke-Hsiao Wu, No. 26, Lane 6, Kao Yang South Rd. Lung Tan Village 325, Tao Yuan Hsien, Taiwan

[21] Appl. No.: 527,442

[22] Filed: Sep. 13, 1995

[51] Int. Cl.[6] .................... F16B 21/00

[52] U.S. Cl. .................... 24/704.1; 24/113 MP; 24/114.9; 24/429

[58] Field of Search .................... 24/113 R, 113 MP, 24/114.9, 429, 419, 704.1

[56] References Cited

U.S. PATENT DOCUMENTS

| | | | |
|---|---|---|---|
| 918,775 | 4/1909 | Schloss | 24/113 R |
| 2,674,771 | 4/1954 | Novick | 24/113 R |
| 2,968,079 | 1/1961 | Brown | 24/419 |
| 2,983,009 | 5/1961 | Dritz | 24/113 R |
| 3,500,507 | 3/1970 | Malhenzie et al. | 24/113 MP |
| 3,787,935 | 1/1974 | Kapitan | 24/113 MP |
| 4,997,222 | 3/1991 | Reed | 24/429 X |
| 5,340,086 | 8/1994 | Dorr | 24/113 MP |
| 5,347,688 | 9/1994 | Ross | 24/429 X |

*Primary Examiner*—Peter M. Cuomo
*Assistant Examiner*—Stephen Vu
*Attorney, Agent, or Firm*—Morton J. Rosenberg; David I. Klein

[57] ABSTRACT

This invention provides a simply constructed sealed button (1) having an elastic spring (2) defining a pair of end portions (4) with respective hook members (6, 7) formed on the opposing end portions (4). A main body housing (5) defining an internal chamber includes a T-shaped conduit mounted within the housing chamber for insert of the hook members (6, 7). The hook members (6, 7) are hooked to each other at an intersecting portion of intersecting through passages of the T-shaped closed conduit. A transparent cover (8) is mounted to the sidewall of the main body housing (5) to provide a sealed button.

1 Claim, 4 Drawing Sheets

SEALED BUTTON

FIELD OF THE INVENTION

This invention relates to a simple sealed button.

BACKGROUND OF THE INVENTION

Presently, a sealed button (FIGS. 1,2) comprises of an elastic spring (2) and a button (3). The elastic spring (2) is a section of thick steel line; and it is bent into an appropriate shape as an arc. Both ends of said elastic spring extended from the arc are as two straight strings (4) that are perpendicular to each other. The ends of the elastic spring (4) have a passive hook (6) and an active hook (7) that are used to button up inside the body (5) of the button (3). The button (3) is composed of a body (5) and a transparent cover (8). The body (5) is an one-side opening circular shell. Inside the body (5), there are the main guided slot (9) and the slant guided slot (10) perpendicular to each other. A button-up space (11) is extended from the rear end of the main guided slot (9); a positioning channel (12) that is installed on the corresponding wall of the of the button-up space (11); the main guided slot (9) and the slant guided slot (10) are used to guide the passive hook (6) and the active hook (7) to button up in position in the button-up space (11). The cover (8) is made to cover the opening of the body (5), and it must be made by transparent material. In order to identify, an identified device (13) is engraved in the back side of the cover (8). In this way, said identified device (13) can not be destroyed or changed by other people. Because of the wholly or partially opening of all the main guided slot (9), the slant guided slot (10) and the button-up space, the shapes of the passive hook (6) and the active hook (7) of the elastic spring (2) and the forming state after buttoning up could be apparently observed through the transparent cover (8). Therefore, such kind of a sealed button lacks secretiveness and security.

OBJECTS OF THE INVENTION

The main purpose of this invention is to offer a sealed button; its shapes of the passive and the active hooks and forming state after buttoning up could not be seen through its transparent cover so that the reliability is increasing.

SUMMARY OF THE INVENTION

A simple sealed button is composed of an elastic spring and a button: an elastic spring is bent into appropriate shape as an arc; the two ends of said elastic spring respectively have an active hook and a passive hook that are perpendicular to each other; through the two concealing guided holes which respectively guide the passive hook and the active hook into the concealing main guided slot and the concealing slant guided slot, the active hook and the passive hook plug into each other and form an unbreakable button. One side of the button is an opening that is used to lock up the cover; inside the button, a button-up space where is respectively perpendicular to the concealing main guided slot and the concealing slant guided slot; on the other side of the button is an outer wall that is perpendicular respectively to the concealing main guided slot and the concealing slant guided slot, too.

SPECIFIC DESCRIPTION

Figure 1:
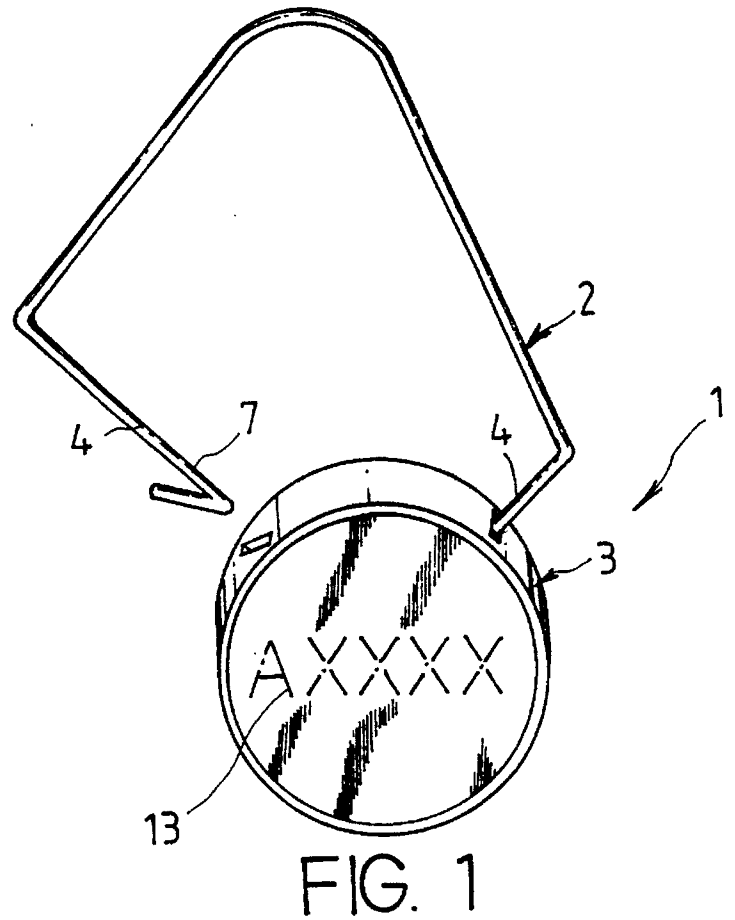
FIG. 1 is an appearance video of the prior art.
Figure 4:
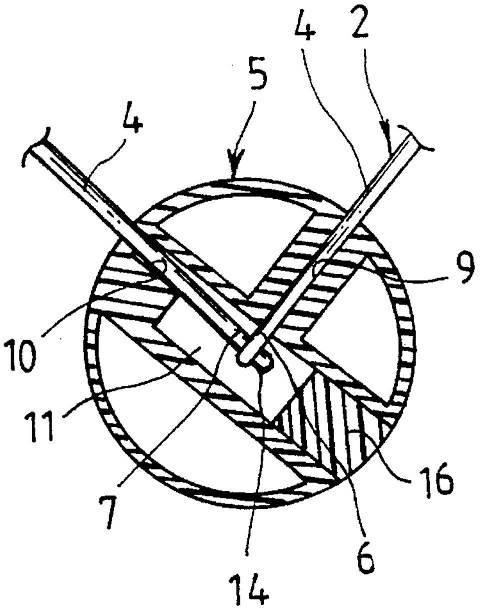
FIG. 4 is the sectional side view of the button which shows the structure of the main, slant guided slots, button-up space and the forming state of the unbreakable button.
Figure 2:
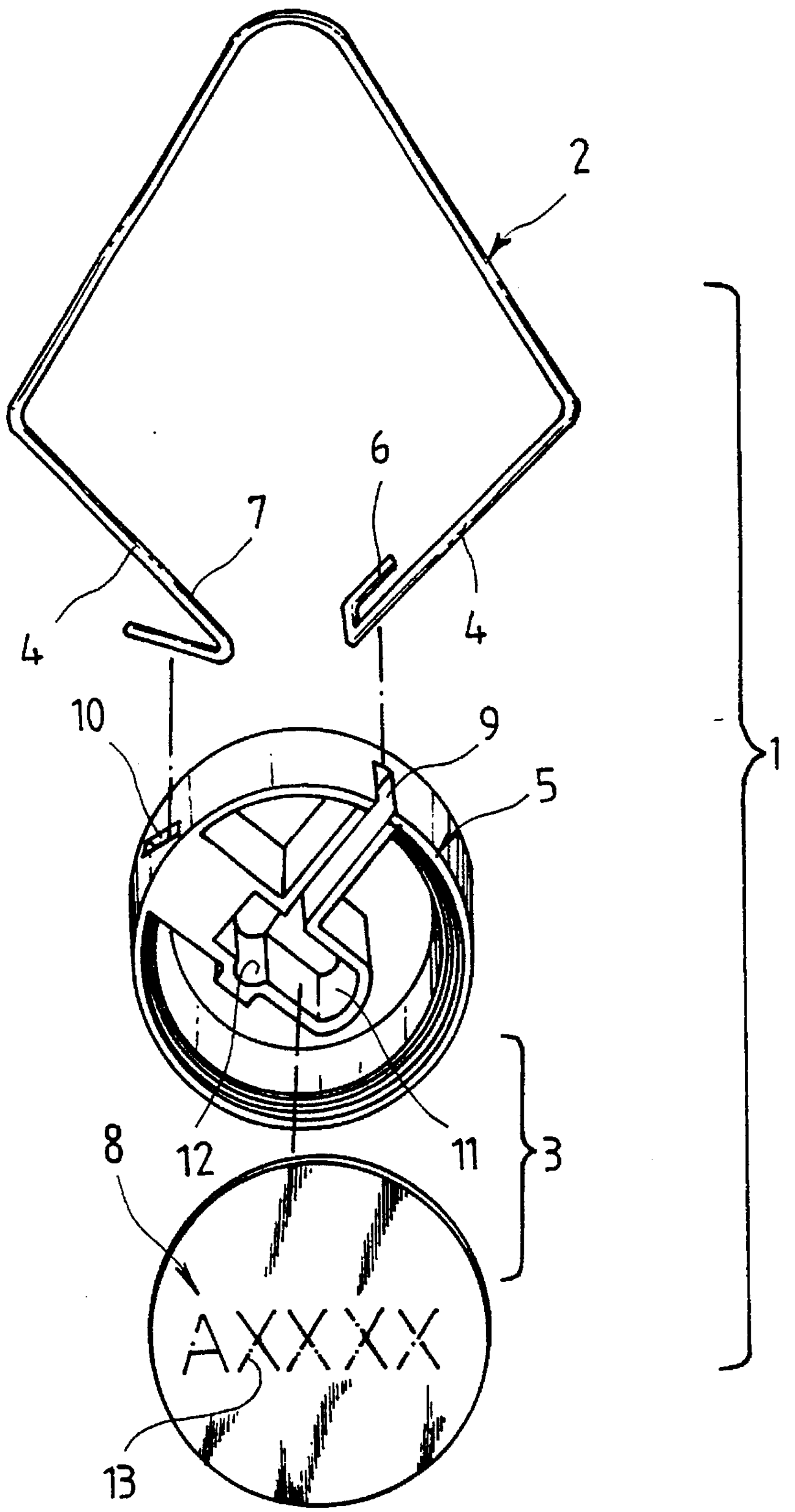
FIG. 2 is a partially spread-out view of the prior art.
Figure 3:
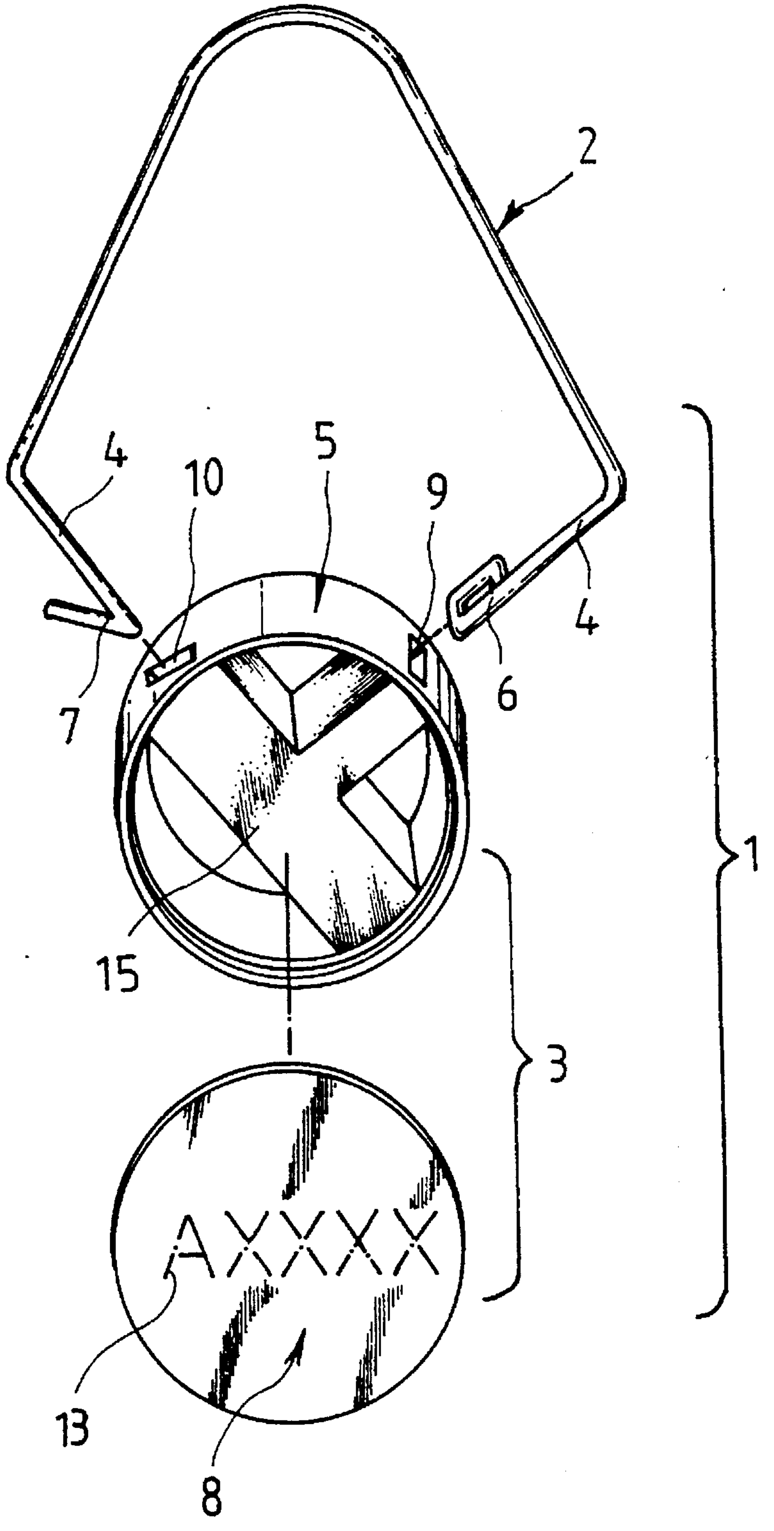
FIG. 3 is a spread-out view of every part of preferred embodiment according to the invention.

Referring to FIG. 3 and FIG. 4, a simple sealed button (1) is composed of an elastic spring (2) and a button (3): the elastic spring (2), basically as same as the prior art, is bent into appropriate shape as an arc; two ends of the elastic spring (2) extended from []the arc are as two straight strings (4) that are perpendicular to each other; the two ends (4) of the elastic spring (2) are the passive hook (6) and the active hook (7) inserted respectively into the concealing main guided slot (9) and the concealing slant guided slot (10) to button up and to form an unbreakable button inside the body (5) of the button (3).

Figure 5:
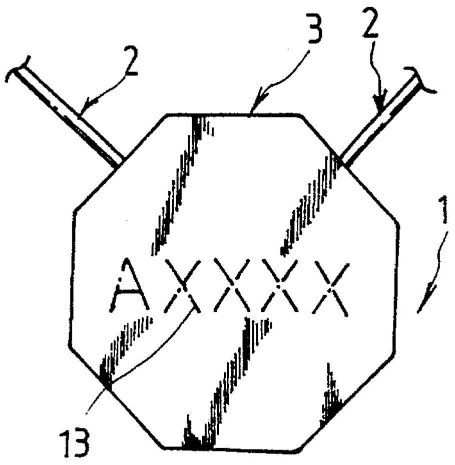
FIG. 5,6,7 are the appearance views of the preferred embodiment 2,3,4 according to the invention.
Figure 6:
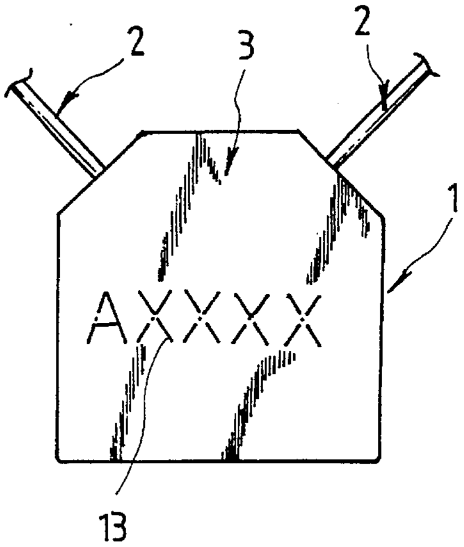
Figure 7:
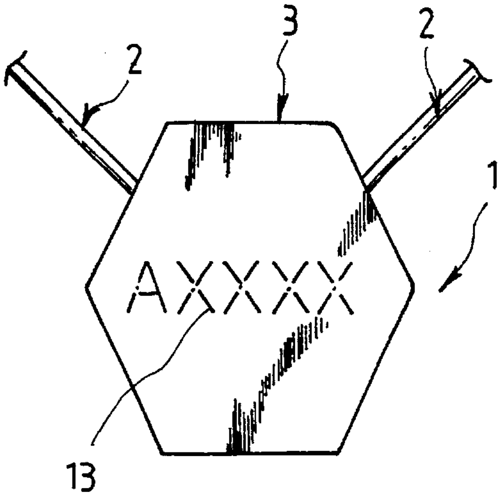

A button (3) is composed of a body (5) and a transparent cover (8): one side of the body (S) is an opening that is made for the transparent cover (8); inside the body (5), there are the concealing main guided slot (9) and the concealing slant guided slot (10) which are perpendicular to each other; on the other side of the body is an outer wall (15) which is respectively perpendicular to the concealing main guided slot (9) and the concealing slant guided slot (10); however, the buttoning devices and the forming state after button-up could not be observed through the transparent cover (8) of the button (3); in this way, the reliability of this simple sealed button is increasing; the two concealing guided holes which are the entrances respectively to the concealing main guided slot (9) and the concealing slant guided slot (10) are set around the body (5) of the button (3); a completely sealing button-up space (11) is extended from the rear end of the concealing main guided slot (9); the passive hook (6) of the elastic spring (2) passes through the concealing main guided slot (9) to the button-up space (11); then, the active hook (7) passes through the concealing slant guided slot (10) to the button-up space (11) and buttons up with the passive hook (7) to form an unbreakable button (14) in the button-up space (11); a stopper (16) that is located behind the button-up space is used to prevent the unbreakable button (14) to slide out of the body (5) of the button (3); a cover is made by the transparent material; there are words or words and pictures engraved in the back side of the transparent cover (8) as an identified device (13) that can not be destroyed or changed by others in the front side of transparent cover (8) in order to be indentified if it is the original simple sealed button (1) or not; the whole cover (8) is united to the opening of the body (5) of the button (3); the body (5) of the button (3) could be the flat circle or angular shape (FIG. 5,6, and 7)

I claim:

1. A sealed button comprising:

(a) a housing body defining an internal housing chamber and a sidewall having a pair of arcuately displaced spring openings formed through said sidewall;

(b) an arcuately contoured elastic spring having substantially linearly directed end portions, each of said linearly directed end portions having a respective hook member;

(c) a T-shaped closed conduit defining a horizontal arm member and a vertical arm member forming a pair of intersecting spring passages respectively aligned with said displaced spring openings for inserting therein respective end portions of said elastic spring, each said hook members of said respective end portions of said elastic spring being inserted through said spring openings and connecting to each other at a location defined as an intersection portion of said intersecting passages;

(d) a stopper member insertable at least partially into an end of said horizontally arm member through said passage opposite one of said spring openings for limiting the displacement of one of said hook members; and, (e) a cover member mounted on said housing body and secured to said sidewall.

* * * * *